United States Patent [19]
Matthews

[11] 3,821,084
[45] June 28, 1974

[54] IMMOBILIZATION OF ENZYMES
[75] Inventor: Joseph S. Matthews, O'Hara Twp., Pa.
[73] Assignee: Gulf Research & Development Company, Pittsburgh, Pa.
[22] Filed: Dec. 19, 1972
[21] Appl. No.: 316,450

[52] U.S. Cl............... 195/68, 195/63, 195/DIG. 11
[51] Int. Cl.............................................. C07g 7/02
[58] Field of Search............... 195/63, 68, DIG. 11; 260/837 R

[56] References Cited
UNITED STATES PATENTS
3,282,702   11/1966   Schreiner.......................... 195/63 X
3,377,406   4/1968    Nemey et al....................... 260/837
3,546,074   12/1970   Deutsch........................... 195/63 X FOREIGN PATENTS OR APPLICATIONS
2,102,514   7/1971    Germany Primary Examiner—David M. Naff

[57] ABSTRACT

Enzymes are immobilized by reaction with an epoxy containing polymer in the presence of an amine such as triethylamine to increase the activity of the immobilized enzyme.

12 Claims, No Drawings

IMMOBILIZATION OF ENZYMES

The invention relates to an improved method for the immobilization of enzymes with an epoxy containing polymer in the presence of an amine to increase the activity of the immobilized enzyme.

Many enzymes can be separated from their natural environment in a living organism and recovered for catalytic use such as, for example, in an industrial process or in a suitable analytical application. Since enzymes are water soluble, some enzymes are able to function in their natural environment in solution, however, most enzymes function within the living organism in association with a membrane. An enzyme which is removed from the organism and is used as a catalyst in an aqueous solution tends to become denatured because of reduced stability in the foreign environment. Furthermore, it is difficult to recover active enzyme catalyst from the product solution. Previously hereto, I have overcome these disadvantages by chemically attaching the enzyme to a hydrophilic, water-insoluble epoxy containing polymer to form a synthetically immobilized enzyme analogous to the membrane-enzyme relationship in nature.

I have discovered an improved method for synthetically immobilizing and supporting enzymes on the epoxy containing polymer. In this improved method an enzyme or mixture of enzymes is chemically united with the epoxy containing polymer in the presence of an amine. The activity of the resulting immobilized enzyme is thereby substantially enhanced in comparison with the immobilized enzyme produced by my previous method which did not utilize an amine. Not only does the enzyme which is immobilized by the epoxy containing polymer in the presence of an amine retain its natural activity to a substantial degree, but it can also be repeatedly reused with substantial retention of its activity.

The immobilized enzyme is chemically bound or coupled to the epoxy containing polymer through one or more epoxy groups of the support or carrier. This coupling reaction takes place with a suitable functional group in the enzyme molecule. Since an epoxy group can react with many different functional groups, the epoxy containing polymer carrier is reactive with and can immobilize a large number and variety of enzymes for catalytic utility.

The epoxy containing polymer by which the enzyme is immobilized is prepared by the reaction of an epoxy monomer having at least one 1,2-epoxy group and one terminal unsaturation per molecule when the epoxy monomer is a single chemical species or per average molecule when the epoxy monomer is a mixture of chemical species as a result of its method of preparation. Suitable available epoxy monomers include glycidyl acrylate, glycidyl methacrylate, allyl glycidyl ether, and the like. Other epoxy monomers which are useful herein include those which are prepared by the reaction of an epoxy resin with a difunctional olefin to form the epoxy monomer as defined. The epoxy monomer is then copolymerized with an olefin monomer by free radical polymerization to form the epoxy containing polymer. In the final step this epoxy containing polymer and the desired enzyme are reacted in the presence of the amine to immobilize the enzyme on the polymer support.

The amine can suitably be a primary, secondary or tertiary amine having the formula $N(R_5)(R_6)(R_7)$ in which $R_5$ is alkyl having from one to six carbon atoms, phenyl or benzyl and $R_6$ and $R_7$ are optionally hydrogen or a hydrocarbon group as defined by $R_5$ or a cyclic amine such as piperidine or pyridine. Examples of suitable amines include trimethylamine, triethylamine, tributylamine, mono- ethylamine, mono-n-hexylamine, aniline, benzylamine, diethylamine, and the like.

The expressions epoxy resin and polyepoxide are used interchangeably to refer to the broad class of initial epoxide containing reactants which are used in the reaction of the difunctional olefin with the epoxy resin to form the epoxy monomer. The epoxy resin can be a single compound or a mixture of compounds containing the alpha-epoxy group and can be monomeric or polymeric. Each epoxy group can be located terminally, internally, or on a cyclic structure that is capable of being used in preparing a thermoset material. The expressions are used with reference to the thermoplastic or uncured state and do not refer to a thermoset or cured material. When the epoxy resin is a single compound, it must contain at least two epoxy groups per molecule. However, with epoxy resins or polyepoxides in which a variety of molecular species are present, the number of epoxy groups will vary from molecular species to molecular species such that the average number of epoxy groups per molecule is specified.

This average number of epoxy groups per molecule is also designated the epoxy equivalent value. When a mixture of compounds is involved, the epoxy equivalent value must be greater than one and preferably at least about two but will generally not be a whole integer. The epoxy equivalent value is obtained by dividing the average molecular weight of the epoxy resin by its epoxide equivalent weight (grams of epoxy resin containing one gram equivalent of epoxide). The epoxy resin can be aliphatic, cycloaliphatic, aromatic, heterocyclic, mixtures of these, saturated or unsaturated, and can include non-interfering groups such as halogen, alkoxy, ester and the like.

This broad class of epoxy resins which is useful in forming the epoxy containing polymer is exemplified by reference to several of the better known types. Glycidyl group epoxy resins are an important type of epoxy resin. This includes the glycidyl ethers, the glycidyl esters, the glycidyl amines, the thioglycidyl resins, the silicon glycidyl resins and the like. The glycidyl ethers include the glycidyl ethers of mononuclear polyhydric phenols, polynuclear polyhydric phenols and the aliphatic polyols. They may be single compounds or more commonly are a mixture of compounds, some of which are polymeric in nature. Illustrative of glycidyl ethers are the di or polyglycidyl ethers of ethylene glycol; trimethylene glycol; glycerol; diglycerol; erythritol; mannitol; sorbitol; polyallyl alcohol; dihydroxymethylcyclohexene; polyepichlorohydrin; butanediol; hydrogenated bisphenol A; 1,3-bis(3-hydroxypropyl)tetramethyldisiloxane; 2,5-bis(hydroxymethyl)tetrahydrofuran; 1,4:3,6-dianhydro-D-sorbitol; 2-butynediol; and the like.

The glycidyl ethers of polyhydric phenols include the glycidyl ethers of resorcinol; hydroquinone; catechol; pyrogallol; phloroglucinol; their methyl derivatives; and the like as well as the glycidyl ethers of polynuclear phenols such as 2,2-bis(4-hydroxyphenyl)propane; bis(4-hydroxyphenyl)methane; 2,2-bis(4-hydroxyphenyl)isobutane; 2,2-bis(2-hydroxynaphthyl)-pentane; 1,5-dihydroxynaphthalene; bisphenol A; 4,4'-dihydroxybiphenyl; 2,3',4-tri(epoxytripropoxy)diphenyl; dihydroxyfluoroanthrene; dihydroxydinaphthylmethane, and the like, and glycidyl ethers of the novolac resins such as bisphenol F.

The epoxy resins also include epoxidized polyolefins generally based on naturally occurring polyolefins such as epoxidized soybean oil, epoxidized cotton seed oil, epoxidized castor oil, epoxidized linseed oil, epoxidized menhaden oil, epoxidized lard oil and the like, but also including epoxidized butadiene, epoxidized polybutadiene, and the like. They also include epoxy resins obtained from chloroacetyl compounds such as 4,4-bis(1,2-epoxyethyl)phenyl ether; 1,3,5(1,2-epoxyethyl)benzene; 1,5(1,2-epoxyethyl)naphthalene; 4,4'-bis(1,2-epoxyethyl)biphenyl; and the like.

Additional useful epoxy resins are diglycidyl isophthalate; diglycidyl phthalate; O-glycidyl phenyl glycidyl ether; 2,6-(2,3-epoxypropyl)phenylglycidyl ether; triglycidyl p-aminophenol; diglycidyl ether of bisphenol-hexafluoroacetone; diglycidyl ether of 2,2-bis(4-hydroxyphenyl)nonadecane; diglycidyl phenyl ether; triglycidyl 4,4-bis(4-hydroxyphenyl)-pentanoic acid; diglycidyl ether of tetrachlorobisphenol A; triglycidyl ether of trihydroxybiphenyl; tetraglycidoxy biphenyl; tetraglycidyl ether of bisresorcinol F; tetraglycidyl ether of resorcinol ketone; diglycidyl ether of bisphenol PA, triglycidoxy-1,1,3-triphenylpropane; and the like. Also included are tetraglycidoxy tetraphenyl ethane; 1,3-bis[3-(2,3-epoxypropoxy)-propyl]tetramethyldisiloxane; diglycidyl ether of polypropylene glycol; polyallyl glydicyl ether; triglycidyl ester of linoleic trimer acid; epoxidized cyclic silane; diglycidyl ether of chlorendic diol; diglycidyl ether of dioxanediol; diglydicyl ether of endomethylene cyclohexanediol; diglycidyl ester of linoleic dimer acid; and the like.

Further examples of epoxy resins are 2,2-bis[4-(2,3-epoxypropyl)cyclohexyl]propane; 2,2-(4-[3-chloro-2-(2,3-epoxypropoxy)propoxyl]cyclohexyl)propane; vinylcyclohexenedioxide; limonene dioxide; 2,2-bis(3,4-epoxycyclohexyl)propane; diglycidyl ether; bis-(2,3-epoxycyclopentyl)ether; dicyclopentadiene dioxide; 1,2-epoxy-6-(2,3-epoxypropoxy)hexahydro-4,7-methanoindane; p-epoxycyclopentylphenyl glycidyl ether; epoxydicyclopentyl glycidyl ether; O-epoxycyclopentylphenyl glycidyl ether; bisepoxydicyclopentyl ether of ethylene glycol; 3,4-epoxycyclohexylmethyl-(3,4-epoxy)cyclohexane carboxylate; 3,4-epoxy-6-methylcyclohexylmethyl-4-epoxy-6-methylcyclohexane carboxylate; dicycloaliphatic diether diepoxy; bis(3,4-epoxy-6-methylcyclohexylmethyl)adipate; and the like. Further information on these epoxy resins and additional examples of useful epoxy resins are discussed and/or referred to in HANDBOOK OF EPOXY RESINS by H. Lee and K. Neville, McGraw-Hill Book Co., 1967.

The difunctional olefin can be defined by the following structural formula $CH_2 = C(R_1)-R_2$ where $R_1$ is hydrogen or methyl and $R_2$ is carboxyl; hydroxymethyl; formyl; chlorocarbonyl; carbamyl; aminomethyl; mercaptocarbonyl; mercaptomethyl; $-CH_2NHR_3$ where $R_3$ is lower alkyl, hydroxyphenyl or lower alkyl substituted hydroxphenyl, or lower alkyl or phenyl substituted hydroxyphenyl. Lower alkyl refers to alkyl groups having one to four carbon atoms. Suitable difunctional olefins include acrylic acid, methacrylic acid, allyl alcohol, acrolein, methacrolein, acrylyl chloride, acrylamide, allylamine, thioacrylic acid, allyl mercaptan, vinyl phenol, and the like.

The difunctional olefin reacts through the functional group other than the unsaturated group with an epoxy group in the polyepoxide in order to form the epoxy monomer. This reaction is illustrated with acrylic acid and a diepoxy resin:

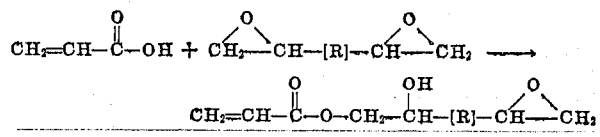

where R merely represents the non-epoxy portion of the polyepoxide. Since the preparation of an epoxy containing polymer is the objective, it is preferable that the amount of the difunctional olefin relative to the epoxy resin be less than the amount that would react with every epoxy group in order that unreacted epoxy groups are available for subsequent reaction after the polymer is formed. Therefore, the ratio of mol equivalents of epoxy groups to difunctional olefin should preferably be greater than one. It is preferred that this ratio be at least about two to one in the reaction mixture used to make the epoxy monomer. This is simply accomplished by using an equimolar mixture of epoxy resin and difunctional olefin in which the epoxy resin has an epoxy equivalent value of at least about two.

The epoxy monomer can be conveniently prepared under conditions for reflux at a temperature between about 100° and about 150° C. and atmospheric pressure. A suitable solvent for the difunctional olefin and the epoxy resin, which is non-reactive in the reaction environment, is selected having a boiling point at the desired reflux temperature. Temperatures below about 100° C. can be used at a lowered reaction rate and temperatures above about 150° C. can be used provided that the materials are stable at the high temperature. The solvent can be toluene, xylene, chlorobenzene, tetrachloroethylene, bromoform, n-butylacetate, acetonitrile, dioxane, dimethyl ether and the like, which are illustrative of the classes of compounds that can serve as a solvent in the reaction.

A catalyst is preferably used for the desired reaction between the epoxy resin and the difunctional olefin. Suitable catalysts for this reaction are the alkyl and aromatic tertiary amines including trimethylamine, triethylamine, tripropylamine, tributylamine, benzyldimethylamine, benzyldiethylamine, pyridine, 2-picoline, 4-picoline, 2,6-lutidine, and the like. The reflux is carried out until the reaction is substantially complete. The epoxy monomer is next copolymerized with the olefinic monomer.

The olefinic monomer copolymerizes with the epoxy monomer by free radical polymerization at the olefinic double bonds in each material. The olefinic monomers are suitable for copolymerization with the epoxy monomer to produce hydrophilic epoxy containing polymers without substantial reaction with the epoxy groups in the epoxy monomer. The preferred olefinic monomers can be defined by the structural formula $CH_2 = C(R_1)-R_4$ where $R_1$ is methyl or hydrogen and $R_4$ is cyano, lower carboalkoxy having one to four carbon alkoxy, and the like and include acrylonitrile, methacrylonitrile, methyl acrylate, methyl methacrylate, and the like. Since the olefinic monomer introduces the hydrophilic property into the polymer, the relative amount of this monomer can be varied to adjust this property. Suitable hydrophilic epoxy containing polymers are made when the epoxy monomer comprises about five to about 30 mol percent of the comonomer mixture.

Suitable free radical initiation can be used such as ionizing radiation, ultraviolet radiation and the like, but preferably chemical free radical initiators are used. The chemical free radical initiators together with accelerators or activators, if needed, are selected according to common practice by correlating the desired temperature of polymerization with the activation temperature of the initiators. Suitable chemical free radical initiators include benzoyl peroxide, lauroyl peroxide, methyl ethyl ketone peroxide, di(2-methylpentanoyl)peroxide, p-chlorobenzoyl peroxide, cyclohexanone peroxide, bis(1-hydroxycyclohexyl)peroxide, hydroxyheptyl peroxide, and the like, dicyclohexyl peroxydicarbonate, dibenzyl peroxydicarbonate, azobisisobutyronitrile, and the like. The polymerization reaction is carried out using a suitable, non-reactive solvent for the monomers generally at a temperature between about 80° C. and about 200° C. Suitable solvents include the solvents specified for the preparation of the epoxy monomer. The same solvent can be conveniently used in each reaction. Following polymerization the polymer is dried of the solvent and formed into a fine powder.

The polymer product is a solid hydrophilic polymer which contains a substantial number of epoxy groups at the surface of the particles available for reaction with other compositions. In order to bind an enzyme to the water-insoluble epoxy containing polymer, the polymer is first dispersed in a water solution of an enzyme and then the amine is added. If the amine is added to the enzyme before the polymer, the enzyme is substantially deactivated yet when the opposite order of addition is employed, the activity of the immobilized enzyme is substantially enhanced. The amine is desirably used in an amount from about ten to about 100 times the weight of the enzyme and preferably from about 20 to about 50 times the weight of the enzyme. Generally the weight of the enzyme in solution is no greater than about one percent of the weight of the polymer support. In the upper end of this range, the enzyme is present in excess over that amount which can be bound. However, the enzyme does not need to be used in substantial excess since only a sufficient amount of enzyme need be used in the immobilization reaction to produce a product of useful activity. During the immobilization reaction, the enzyme comes into reactive contact with the polymer aided by the hydrophilic nature of the polymer. The binding reaction occurs through one or more of the large number of epoxy groups available for reaction on the surface of the polymer particles and through one or more epoxy reactive groups in the enzyme. Epoxy reactive groups are listed in Appendix 5-1 of the Lee and Neville book.

This binding reaction is preferably carried out at a low temperature, such as 0° to 10° C., to avoid undue denaturation of the enzyme and with gentle agitation to insure good contact of the enzyme with the polymer. This enzyme immobilization reaction is carried out for a long enough time to bind a useful amount of the enzyme on the polymer generally from about 1 to about 8 hours. The enzyme-polymer product is then filtered and washed with buffered aqueous solution to remove non-bound enzyme and the amine, and is left moist to maintain the activity of enzyme. The immobilized enzyme is used as a catalyst in contact with an aqueous solution of the substance undergoing conversion. It possesses a substantial portion of its natural activity and it can be repeatedly recovered for reuse and can be used for long periods of time without substantial loss of activity.

The following examples are set out to illustrate the invention and to provide a better understanding of its details and advantages. An International Unit (I.U.) is defined as the amount of enzyme which converts one micromol of substrate per minute.

EXAMPLES 1–8

Two epoxy containing polymers were made as illustrated by the following procedure.

A 27 gram portion of Epon 834 (a diglycidyl ether of bisphenol A having an epoxy equivalent value of 280 obtained from Shell Chemical Company) dissolved in 100 ml. of toluene, 8.2 grams of methacrylic acid and 1.0 ml. of triethylamine were placed in the resin kettle equipped with mechanical stirrer, condenser, nitrogen inlet and heating mantle.

The reaction mixture was refluxed with stirring under a nitrogen atmosphere as one ml. samples of the reaction mixture were periodically sampled and titrated with 0.1 N sodium hydroxide to analyze for methacrylic acid. When analysis indicated that about 95 percent of the methacrylic acid had been consumed, 50 ml. of toluene were removed by distillation.

This was followed by the addition of 200 ml. of benzene and 27 grams of methacrylonitrile and one gram of azobisisobutyronitrile. The reaction mixture was stirred under reflux for 5 hours during which time the polymer product came out of solution. The polymer product was filtered, washed with benzene, ground and dried under vacuum yielding 61 percent based on total reactants (38 grams) of a fluffy, white powdered polymer product having an epoxy equivalent value of 3,817.

A 500 mg. portion of polymer which had passed through a 100 mesh sieve was placed in a 30 ml. screw cap bottle. Glucose oxidase, which had been dissolved in a 0.1 M potassium phosphate buffer at pH 7.0, was added to the bottle. The amine was then added to the bottle which was closed and slowly rotated in a cold room at about 0° C. for four hours. The suspension was then filtered through a medium porosity fritted glass funnel and washed with about 90 ml. of phosphate buffer to remove unbound enzyme. The filtrate was diluted and colorimetrically analyzed for unbound enzyme. The bound enzyme was determined by difference. An aliquot of the damp polymer was analyzed and the activity determined colorimetrically.

The data set out in Table I compares the activity of six immobilized glucose oxidase products in which an amine was used in the immobilization reaction and two where no amine was used. Polymer A was made by the procedure described above in which 20 mol percent of the epoxy monomer was polymerized with methacrylonitrile while polymer B differed in that it was made by polymerizing ten mol percent of the epoxy monomer with methacrylonitrile. In each example 500 mg. of the polymer was used.

Table I

| Example | Polymer | Amine | E/A[a] | Bound enzyme mg./gm[b] | Activity, %[c] |
|---|---|---|---|---|---|
| 1 | A | none | .58/0 | .66 | 26 |
| 2 | A | n-tributyl | .58/16 | .52 | 43 |
| 3 | A | piperidine | .58/16 | .54 | 33 |
| 4 | A | pyridine | .58/16 | .52 | 31 |
| 5 | B | none | 1.94/0 | 1.96 | 16 |
| 6 | B | triethyl | 1.94/7 | 2.10 | 26 |
| 7 | B | triethyl | .98/56 | 1.54 | 53 |
| 8 | B | triethyl | .98/280 | .98 | 24 |

[a] mg. of glucose oxidase and mg. of amine used in the immobilization solution.
[b] mg. of immobilized glucose oxidase per gm. of polymer.
[c] activity of immobilized enzyme × 100/activity of enzyme in solution.

When 56 mg. of triethylamine were added to the enzyme solution described in Example 7 without polymer present, the activity of the enzyme was reduced from 80.6 I.U. to 3.6 I.U. which is 4.5 percent of the original activity in solution.

It is to be understood that the above disclosure is by way of specific example and that numerous modifications and variations are available to those of ordinary skill in the art without departing from the true spirit and scope of our invention.

I claim:

1. A method for the preparation of an immobilized enzyme which comprises reacting an aqueous solution of an enzyme with an epoxy containing polymer prepared by the free radical copolymerization of an epoxy monomer having at least one 1,2-epoxy group and one terminal unsaturation and an olefin monomer having the formula $CH_2 = C(R_1)\text{-}R_4$ in which $R_1$ is hydrogen or methyl and $R_4$ is cyano or lower carboalkoxy in the presence of an amine selected from the class consisting of piperidine; pyridine; a primary, secondary or tertiary amine having the formula $N(R_5)(R_6)(R_7)$ in which $R_5$ is alkyl having from one to six carbon atoms, phenyl or benzyl and $R_6$ and $R_7$ are optionally hydrogen or a hydrocarbon group as defined by $R_5$; and mixtures thereof, whereby an active, immobilized enzyme is produced.

2. A method for the preparation of an immobilized enzyme in accordance with claim 1 in which the epoxy monomer is selected from glycidyl acrylate, glycidyl methacrylate, allyl glycidyl ether, or mixtures thereof.

3. A method for the preparation of an immobilized enzyme in accordance with claim 1 in which the epoxy monomer is prepared by the reaction of a polyepoxide having an epoxy equivalent value greater than one with a difunctional olefin having an unsaturated group and a second functional group and defined by the structural formula $CH_2 = C(R_1)\text{-}R_2$ in which $R_1$ is hydrogen or methyl and $R_2$ is carboxyl; hydroxymethyl; formyl; chlorocarbonyl; lower carboalkoxy; carbamyl; aminomethyl; mercaptocarbonyl; mercaptomethyl; $-CH_2NHR_3$ where $R_3$ is lower alkyl, hydroxyphenyl or lower alkyl substituted hydroxyphenyl; or lower alkyl or phenyl substituted hydroxyphenyl; said polyepoxide reacting with the difunctional olefin through the said second functional group.

4. A method for the preparation of an immobilized enzyme in accordance with claim 1 in which the epoxy monomer is between about five and about 30 mol percent of the comonomer mixture comprising the epoxy monomer and the olefin monomer.

5. A method for the preparation of an immobilized enzyme in accordance with claim 1 in which the olefin monomer is acrylonitrile or methacrylonitrile.

6. A method for the preparation of an immobilized enzyme in accordance with claim 3 in which the polyepoxide is a diglycidyl ether of bisphenol A.

7. A method for the preparation of an immobilized enzyme in accordance with claim 3 in which the ratio of mol equivalents of epoxy groups in the polyepoxide to mols of difunctional olefin is greater than one.

8. A method for the preparation of an immobilized enzyme in accordance with claim 7 in which the ratio of mol equivalents of epoxy groups in the polyepoxide to mols of difunctional olefin is at least about two.

9. A method for the preparation of an immobilized enzyme in accordance with claim 1 in which the amine is piperidine.

10. A method for the preparation of an immobilized enzyme in accordance with claim 1 in which the amine is pyridine.

11. A method for the preparation of an immobilized enzyme in accordance with claim 1 in which the amine is triethylamine.

12. A method for the preparation of an immobilized enzyme in accordance with claim 1 in which the amine is tributylamine.

* * * * *